US011045783B2

(12) United States Patent
Cooks et al.

(10) Patent No.: US 11,045,783 B2
(45) Date of Patent: Jun. 29, 2021

(54) SYSTEMS AND METHODS FOR INCREASING REACTION YIELD

(71) Applicant: Purdue Research Foundation, West Lafayette, IN (US)

(72) Inventors: Robert Graham Cooks, West Lafayette, IN (US); Michael Stanley Wleklinski, Indianapolis, IN (US); David Logsdon, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 159 days.

(21) Appl. No.: 15/673,658

(22) Filed: Aug. 10, 2017

(65) Prior Publication Data

US 2018/0043327 A1    Feb. 15, 2018

Related U.S. Application Data

(60) Provisional application No. 62/374,144, filed on Aug. 12, 2016.

(51) Int. Cl.
*B01J 19/24* (2006.01)
*B01J 14/00* (2006.01)
(Continued)

(52) U.S. Cl.
CPC ........ *B01J 19/2465* (2013.01); *B01D 5/0069* (2013.01); *B01D 19/0031* (2013.01);
(Continued)

(58) Field of Classification Search
CPC ...... B01J 19/2465; B01J 14/00; B01J 19/087; B01J 19/26; B01J 2219/0803;
(Continued)

(56) References Cited

U.S. PATENT DOCUMENTS 3,475,917 A * 11/1969 Schwing ................. F25B 47/00
                                                         62/85
4,612,045 A *  9/1986 Shintaku ................ B01J 10/002
                                                         148/207
(Continued)

FOREIGN PATENT DOCUMENTS

WO    2009/102766 A1    8/2009
WO    2018/004769 A2    1/2018

OTHER PUBLICATIONS

Bain, 2014, Mass Spectrometry in Organic Synthesis: Claisen-Schmidt Base-Catalyzed Condensation and Hammett Correlation of Substituent Effects, J. Chem. Educ., vol. 91: pp. 1985-1989.
(Continued)

*Primary Examiner* — Xiuyu Tai
(74) *Attorney, Agent, or Firm* — Brown Rudnick LLP; Adam M. Schoen (57) ABSTRACT

The invention generally relates to systems and methods for increasing reaction yield. In certain embodiments, the invention provides systems for increasing a yield of a chemical reaction that include a pneumatic sprayer configured to generate a liquid spray discharge from a solvent. The solvent includes a plurality of molecules, a portion of which react with each other within the liquid spray discharge to form a reaction product. The system also includes a collector positioned to receive the liquid spray discharge including the unreacted molecules and the reaction product. The system also includes a recirculation loop connected from the collector to the pneumatic sprayer in order to allow the unreacted molecules and the reaction product to be recycled through the pneumatic sprayer, thereby allowing a plurality of the unreacted molecules to react with each other as the unreacted molecules cycle again through the system.

19 Claims, 9 Drawing Sheets

(51) Int. Cl.
| | |
|---|---|
| *B01J 19/08* | (2006.01) |
| *B01J 19/26* | (2006.01) |
| *B01D 5/00* | (2006.01) |
| *B01D 19/00* | (2006.01) |
| *B05B 5/03* | (2006.01) |
| *B01J 4/00* | (2006.01) |
| *H01J 49/26* | (2006.01) |
| *B05B 5/025* | (2006.01) |

(52) U.S. Cl.
CPC .............. *B01J 4/002* (2013.01); *B01J 14/00* (2013.01); *B01J 19/087* (2013.01); *B01J 19/26* (2013.01); *B05B 5/03* (2013.01); *B01J 2219/00087* (2013.01); *B01J 2219/00099* (2013.01); *B01J 2219/0803* (2013.01); *B01J 2219/0884* (2013.01); *B05B 5/025* (2013.01); *H01J 49/26* (2013.01)

(58) Field of Classification Search
CPC ...... B01J 2219/0884; B01J 2219/00087; B01J 2219/00099; B01J 4/002; B01J 19/123; B01J 2219/00141; B01J 2219/0286; B01J 2219/029; B01J 2219/00123; B01J 2219/00128; B01J 2219/0013; B01J 2219/00137; B01J 2219/00139; B01D 19/0031; B01D 5/0069; B05B 5/03; B05B 5/025; H01J 49/26; C01B 21/06; C01B 13/20; C01P 2004/04; B22F 1/0011; B22F 1/0018; B22F 9/28; B22F 9/12; B22F 9/30; B22F 2998/10; B22F 2201/02; B22F 2304/05; B22F 2304/10; G01N 21/33; G01N 21/359; G01N 21/43; C09K 5/045; C09K 2205/126; C22C 18/00; C01G 9/03
See application file for complete search history.

(56) References Cited

U.S. PATENT DOCUMENTS

| | | | | |
|---|---|---|---|---|
| 5,958,361 | A * | 9/1999 | Laine ................... | B82Y 30/00 423/593.1 |
| 8,859,956 | B2 | 10/2014 | Ouyang et al. | |
| 2008/0295580 | A1* | 12/2008 | Minor ................... | G01N 21/33 73/40.7 |
| 2013/0061612 | A1* | 3/2013 | Shiflett ................. | F25B 45/00 62/77 |
| 2013/0214200 | A1* | 8/2013 | Yang ..................... | B01J 8/067 252/182.1 |
| 2015/0047467 | A1* | 2/2015 | Ruud .................... | C01B 21/06 75/338 |
| 2015/0299891 | A1* | 10/2015 | Buckalew ............. | C25D 7/123 205/82 |
| 2016/0251556 | A1* | 9/2016 | Poole .................... | C09K 5/045 252/67 |
| 2016/0268113 | A1* | 9/2016 | Brown .................. | H01J 49/00 |

OTHER PUBLICATIONS

Bain, 2015, Accelerated Hantzsch electrospray synthesis with temporal control of reaction intermediates, Chem. Sci., vol. 6: pp. 397-401.

Bain, 2016, Accelerated Chemical Reactions and Organic Synthesis in Leidenfrost Droplets, Angewandte Chemie, 55 (35):10478-10482.

Banerjee, 2015, Syntheses of Isoquinoline and Substituted Quinolines in Charged Microdroplets, Angew. Chem. Int. Ed., vol. 54: pp. 14795-14799.

Carroll, 1975, Atmospheric Pressure Ionization Mass Spectrometry: Corona Discharge Ion Source for Use in Liquid Chromatograph-Mass Spectrometer-Computer Analytical System, Anal. Chem. 47:2369-2373.

Fenn et al., 1989, Electrospray Ionization for Mass Spectrometry of Large Biomolecules, Science 246:64-71.

Fico, 2007, Miniaturization and Geometry Optimization of a Polymer-Based Rectilinear Ion Trap, Anal. Chem., 79:8076-8082.

Gao et al., Design and Characterization of a Multisource Hand-Held Tandem Mass Spectrometer, Z. Anal. Chem. 2008, 80:7198-7205.

Gao, 2006, Handheld Rectilinear Ion Trap Mass Spectrometer, Anal. Chem., 78:5994-6002.

Hou, 2011, Sampling Wand for an Ion Trap Mass Spectrometer, Anal. Chem, 83:1857-1861.

Karas, 2000, Nano-electrospray ionization mass spectrometry: addressing analytical problems beyond routine, Fresenius J. Anal. Chem., 366:669-676.

Kogelschatz, 2003, Dielectric-barrier Discharges: Their History, Discharge Physics, and Industrial Applications, Plasma Chem. and Plasma Processing, 23:1-46.

Laiko, 2000, Atmospheric Pressure Matrix-Assisted Laser Desoprtion/Ionization Mass Spectrometry, Analytical Chemistry, 72:652-657.

Li, 2016, The Role of the Interface in THin Film and Droplet Accelerated Reactions Studied by Competitive Substituent Effects, Angewandte Chemie International Edition, 55(10):3433-3437.

Muller, 2012, Accelerated Carbon-Carbon Bond-Forming Reactions in Preparative Electrospray, Agnew Chem. Int. Ed., 51:11832-11835.

Mulligan, 2006, Desorption electrospray ionization with a portable mass spectrometer: in situ analysis of ambient surfaces, Chem Comm, et al., Chemical Communications, 1709-1711.

Ouyang, 2009, Handheld Miniature Ion Trap Mass Spectrometers, Anal. Chem., 81:2421-2425.

Ouyang, 2009, Miniature Mass Spectrometers, Annual Review of Analytical Chemistry, 2:187-214.

Pan, 2004, Nanoelectrospray Ionization of Protein Mixtures: Solution pH and Protein pI, Anal. Chem, vol. 76: pp. 1165-1174.

Sanders, 2009, Hand-held Mass Spectrometer for Environmentally Relevant Analytes Using a Variety of Sampling and Ionization Methods, Euro. J. Mass Spectrom,16:11-20.

Shiea, 2005, Electrospray-assisted laser desorption/ionization mass spectrometry for direct ambient analysis of solids, J. Rapid Communications in Mass Spectrometry, 19:3701-3704.

Sokol, 2011, Miniature mass spectrometer equipped with electrospray and desorption electrospray ionization for direct analysis of organics from solids and solutions, Int. J. Mass Spectrum. 306:187-195.

Takats, 2004, Electronsonic Spray Ionization. A Gentle Technique for Generating Folded Proteins and Protein Complexes in the Gas Phase and for Studying Ion-Molecule Reactions at Atmospheric Pressure, Anal. Chem., 76(14):4050-4058.

Tanaka, 1988, Protein and Polymer Analyses up to m/z 1000000 by Laser Ionization Time-of-flight Mass Spectrometry Rapid Commun. Mass Spectrom., 2:151-153.

Xu, 2010, Miniaturization of Mass Spectrometry Analysis Systems, JALA, 15:433-439.

Yamashita, 1984, Electrospray Ion Source. Another Variation on the Free-Jet Theme, J. Phys. Chem., 88:4451-4459.

* cited by examiner

SYSTEMS AND METHODS FOR INCREASING REACTION YIELD

RELATED APPLICATION

This application claims the benefit of and priority to U.S. provisional application Ser. No. 62/374,144, filed Aug. 12, 2016, the content of which is incorporated by reference herein in its entirety.

GOVERNMENT INTEREST

This invention was made with government support under W911NF-16-2-0020 awarded by the Defense Advanced Research Projects Agency (DARPA). The government has certain rights in the invention.

FIELD OF THE INVENTION

The invention generally relates to systems and methods for increasing reaction yield.

BACKGROUND

Acceleration of the rates of ordinary organic reactions in droplets by large factors has been reported. The acceleration is partly the result of solvent evaporation and the resulting increase in reagent concentrations. However, there is also evidence of intrinsic reaction acceleration at the surfaces of droplets, so that the increased surface to volume ratio of microdroplets plays a significant role in reaction acceleration. In several studies, the distance of travel of droplets in a spray correlates roughly with the extent of reaction, suggesting that evaporation which creates smaller droplets also increases reaction rates.

However, there is a limit as to how far the droplets can travel within the spray. Accordingly, a problem with using spray techniques to generate reaction products is that reactions do not go to completion and product yield can be low.

SUMMARY

The invention provides systems and methods for increasing reaction yield for reactions conducted in a liquid spray discharge. Aspects of the invention are accomplished by using a system with a recirculation function. In that manner, if a reaction is incomplete, the sprayed material can be collected and resprayed in order to be processed one or more times. That provides unreacted molecules a chance to react and allows incomplete reactions to be driven to completion, thereby increasing a yield of a chemical reaction. In a preferred approach, the solvent may be condensed and reused so that the collected material including unreacted reagents and reaction products is taken up again in the body of the solution being resprayed. In that way, a continuous process maximizes product yields and saves solvent.

In certain aspects, the invention provides systems for increasing a yield of a chemical reaction that include a pneumatic sprayer configured to generate a liquid spray discharge from a solvent. The solvent includes a plurality of molecules, a portion of which react with each other within the liquid spray discharge to form a reaction product. The system also includes a collector positioned to receive the liquid spray discharge including the unreacted molecules and the reaction product. The system also includes a recirculation loop connected from the collector to the pneumatic sprayer in order to allow the unreacted molecules and the reaction product to be recycled through the pneumatic sprayer, thereby allowing a plurality of the unreacted molecules to react with each other as the unreacted molecules cycle again through the system.

The system may further include a voltage source operably associated with the pneumatic sprayer in order to generate a charged liquid spray discharge. The collector may include one or more of the following components. In certain embodiments, the collector includes an electrostatic precipitator. The collector may also include a liquid degassing unit within a vacuum chamber positioned after the electrostatic precipitator, thereby allowing gas from the pneumatic sprayer to be released from the system. An exemplary liquid degassing unit is one that includes a semi-permeable membrane within the vacuum chamber. The collector may also include a condenser positioned after the liquid degassing outlet within the vacuum chamber. An exemplary condenser is a cryogenic condenser. The system may also include a mass spectrometer (either on-line or offline). In certain embodiments, the pneumatic sprayer is an electrosonic spray ionization source. The system may also include an elongate member between the pneumatic sprayer and the collector.

Other aspects of the invention provide methods for increasing yield of a chemical reaction that involve generating a liquid spray discharge using a pneumatic sprayer. The liquid spray discharge is generated from a solvent that includes a plurality of molecules, a portion of which react with each other within the liquid spray discharge to form a reaction product. The method then involves collecting in a collector the liquid spray discharge including unreacted molecules and the reaction product. The method then involves recirculating the unreacted molecules and the reaction product through the pneumatic sprayer in order to allow a plurality of the unreacted molecules in the solvent to react with each other as the unreacted molecules cycle again through the pneumatic sprayer, thereby increasing a yield of the chemical reaction.

In certain embodiments, a voltage source is operably associated with the pneumatic sprayer in order to generate a charged liquid spray discharge. Collecting may involve condensing the liquid spray discharge into a reservoir of the collector, using for example, a cryogenic condenser. Collecting may further involve precipitating liquid droplets prior to the condensing step. Collecting may also involve degassing gas used by the pneumatic sprayer to generate the liquid spray discharge. In certain embodiments, degassing uses a liquid degassing unit including a semi-permeable membrane within a vacuum chamber. The method may additionally involve analyzing the reaction product, which may be through use of a bench-top mass spectrometer or miniature mass spectrometer. In certain embodiments, the pneumatic sprayer is an electrosonic spray ionization source. The methods of the invention may further involve controlling an extent of formation of the reaction product by varying a distance between the pneumatic sprayer and the collector.

In other aspects, the invention provides systems that include an inlet port, a droplet forming region, and a condensing region. The droplet forming region and the liquid condensing region are operably coupled to each other to via tubing to form a circulating loop for flow such that a portion of reagents introduced via the inlet port react with each other in droplets formed in the droplet forming region to produce reaction product. The reaction product is condensed along with unreacted reagents in the condensing region. The reaction product and the unreacted reagents are re-circulated through the system one or more times, thereby allowing the unreacted reagents to react with each other as the unreacted reagents cycle again through the system.

In certain embodiments, the droplet forming region includes a flow regulating valve (such as a needle valve) and an evaporator. In certain embodiments, the condensing region includes a condenser. The system may further include a pump. The pump may be a compressor, which is situated between the evaporator and the condenser.

In certain embodiments, a portion of the tubing is transparent, allowing for observation of flow within the system. In other or additional embodiments, the system includes or more pressure sensors. In other or additional embodiments, the system also includes an outlet port. The outlet port may be coupled to an outlet tube that is operably associated with a voltage source in a manner that an electrospray plum is generated at a distal end of the outlet tube. In such embodiments, the system may further include an analytical instrument, such as a mass spectrometer, operably associated with the system to receive the spray generated at the distal end of the outlet tube. In other embodiments, the outlet allows for extraction of reaction product from the system for off-line analysis.

Figure 3:
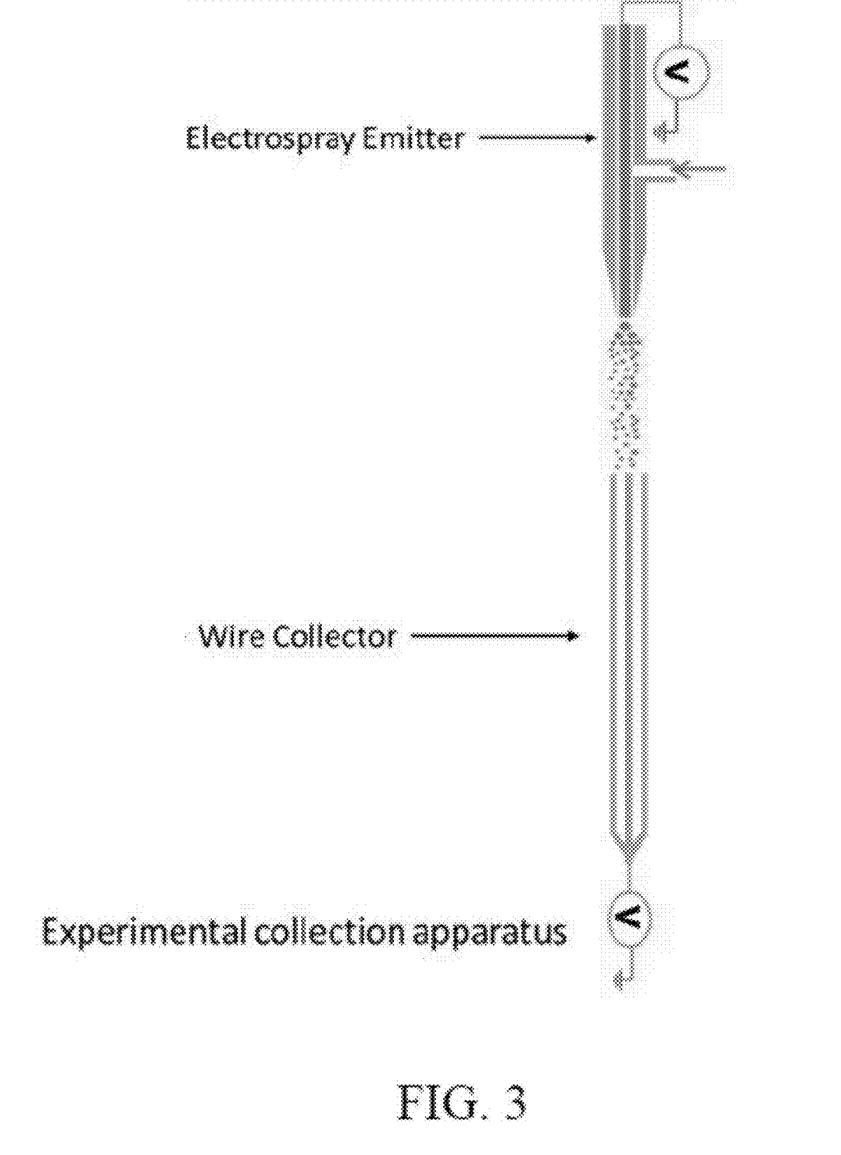

FIG. 3 is a photograph and schematic showing a six silver wire electrostatic precipitator that precipitates small positively charged microdroplets from the liquid spray discharge of the pneumatic sprayer. Positively charged microdroplets from the sprayer (left) are attracted to the negatively charged silver wire electrostatic precipitator where they are deposited.

FIG. 4 shows data for a Claisen Schmidt condensation reaction showing ratio of product (red) to reactant (yellow) for (top) 5 min bulk reaction, (middle) collection with a 8 kV potential difference between sprayer (+4 kV) and electrostatic collector, and (bottom) 0 V potential difference.

FIG. 5 is a schematic showing another embodiment of the invention in which the collector includes an electrostatic precipitator and degassing unit in addition to the condenser.

FIG. 6 is an illustration showing an exemplary data analysis module for implementing the systems and methods of the invention in certain embodiments.

FIG. 7 is a diagram showing the principle components of a vapor compressor system. Temperatures and states of refrigerant at various points in the system are indicated.

FIG. 8 is a diagram showing a vapor compression system with additions to complete the system. Such additions are indicated with arrows.

FIG. 9 shows a mass spectrum of the rinse solution used to recover product from the refrigerator system. The starting material and product peaks are labeled with their corresponding structures. Note that 1 loses ammonia in the source and appears as m/z 134.

DETAILED DESCRIPTION

The invention generally relates to systems and methods for increasing reaction yield. In certain embodiments, the invention provides systems, such as those shown in FIG. 1, for increasing a yield of a chemical reaction. Such systems may include a pneumatic sprayer configured to generate a liquid spray discharge from a solvent. The solvent includes a plurality of molecules, a portion of which react with each other within the liquid spray discharge to form a reaction product. The system also includes a collector positioned to receive the liquid spray discharge including the unreacted molecules and the reaction product. The system also includes a recirculation loop connected from the collector to the pneumatic sprayer in order to allow the unreacted molecules and the reaction product to be recycled through the pneumatic sprayer, thereby allowing a plurality of the unreacted molecules to react with each other as the unreacted molecules cycle again through the system.

Without being limited by an particular theory or mechanism of action, it is believed that repeatedly spraying, collecting the sprayed material, and re-spraying should build up product even if product formation is incomplete in a single spray event. Collection of the droplets and evaporated solvent is economical and avoids undesirable solvent waste. In certain embodiments, a combination of condensation of vapor and electrical precipitation of droplets is a means of collection of neutral vapor and charged particulates. The latter, with their cargo of product, can also be collected separately in an electrostatic precipitator.

In general, the systems of the invention can include a spray system in which pneumatics and optionally electrical potential are used to create a fine spray, for example an electrosonic spray ionization source, such as described for example in Takats et al. (Anal. Chem., 2004, 76 (14), pp 4050-4058), the content of which is incorporated by reference herein in its entirety. The skilled artisan will recognize that any source that generates a liquid spray discharge including small droplets (e.g., microdroplets), charged or uncharged, can be used with systems and methods of the invention.

Additional exemplary ionization sources include techniques that utilize ionization sources at atmospheric pressure for mass spectrometry include electrospray ionization (ESI; Fenn et al., Science, 246:64-71, 1989; and Yamashita et al., J. Phys. Chem., 88:4451-4459, 1984); atmospheric pressure ionization (APCI; Carroll et al., Anal. Chem. 47:2369-2373, 1975); and atmospheric pressure matrix assisted laser desorption ionization (AP-MALDI; Laiko et al. Anal. Chem., 72:652-657, 2000; and Tanaka et al. Rapid Commun. Mass Spectrom., 2:151-153, 1988). The content of each of these references in incorporated by reference herein its entirety.

Other exemplary mass spectrometry techniques that work with systems and methods of the invention utilize direct ambient ionization/sampling methods that include direct analysis in real time (DART; Cody et al., Anal. Chem., 77:2297-2302, 2005); Atmospheric Pressure Dielectric Barrier Discharge Ionization (DBDI; Kogelschatz, Plasma Chemistry and Plasma Processing, 23:1-46, 2003, and PCT international publication number WO 2009/102766), and electrospray-assisted laser desorption/ionization (ELDI; Shiea et al., J. Rapid Communications in Mass Spectrometry, 19:3701-3704, 2005). The content of each of these references in incorporated by reference herein its entirety.

In certain embodiments, ions of a sample are generated using nanospray ESI. Exemplary nano spray tips and methods of preparing such tips are described for example in Wilm et al. (Anal. Chem. 2004, 76, 1165-1174), the content of which is incorporated by reference herein in its entirety. NanoESI is described for example in Karas et al. (Fresenius J Anal Chem. 2000 March-April; 366(6-7):669-76), the content of which is incorporated by reference herein in its entirety.

The system may also include a collector that includes one or more of the following components. A condenser, such as a cryogenic condenser, may be used in the collector in order to collect vapor phase products. In certain embodiments, that is all that is required for collection of reaction product within the liquid spray discharge. In other embodiments, the collector also includes a liquid degassing unit. An exemplary liquid degassing unit is a semi-permeable membrane (e.g. silicone polymer) within a vacuum chamber. For example, dimethylsiloxane tubing allows pervaporation of the pneumatic gas into the rough pump vacuum. Such a unit allows the gas used as the source of pneumatic power to create the sprayed droplets to escape the closed system. The collector may also include an electrostatic precipitator with appropriate applied potentials to collect small charged droplets and then either wash them back into the main spray reservoir or collect this product-rich material into a separate container. An exemplary electrostatic precipitator is commercially available from Clarcor. Another exemplary electrostatic precipitator utilizes negatively charged silver wires, as illustrated in FIG. 3.

The system then includes a recirculation line that connects the collector and the pneumatic sprayer. In that manner, the unreacted molecules and the reaction product are recycled through the pneumatic sprayer, thereby allowing a plurality of the unreacted molecules to react with each other as the unreacted molecules cycle again through the system.

The Venturi effect, as described in Santos et al. (Analytical Chemistry 2011, 83 (4), 1375-1380), can be used to drive flow through the recirculation loop by making the recirculation loop using a Venturi tube. Alternatively, the recirculation loop can be operably associated with a pump that drives flow from the collector back to the pneumatic sprayer. Since systems of the invention may be closed-loop system, in certain embodiments, the components of the pneumatic sprayer drive flow through the entire system.

Figure 1:
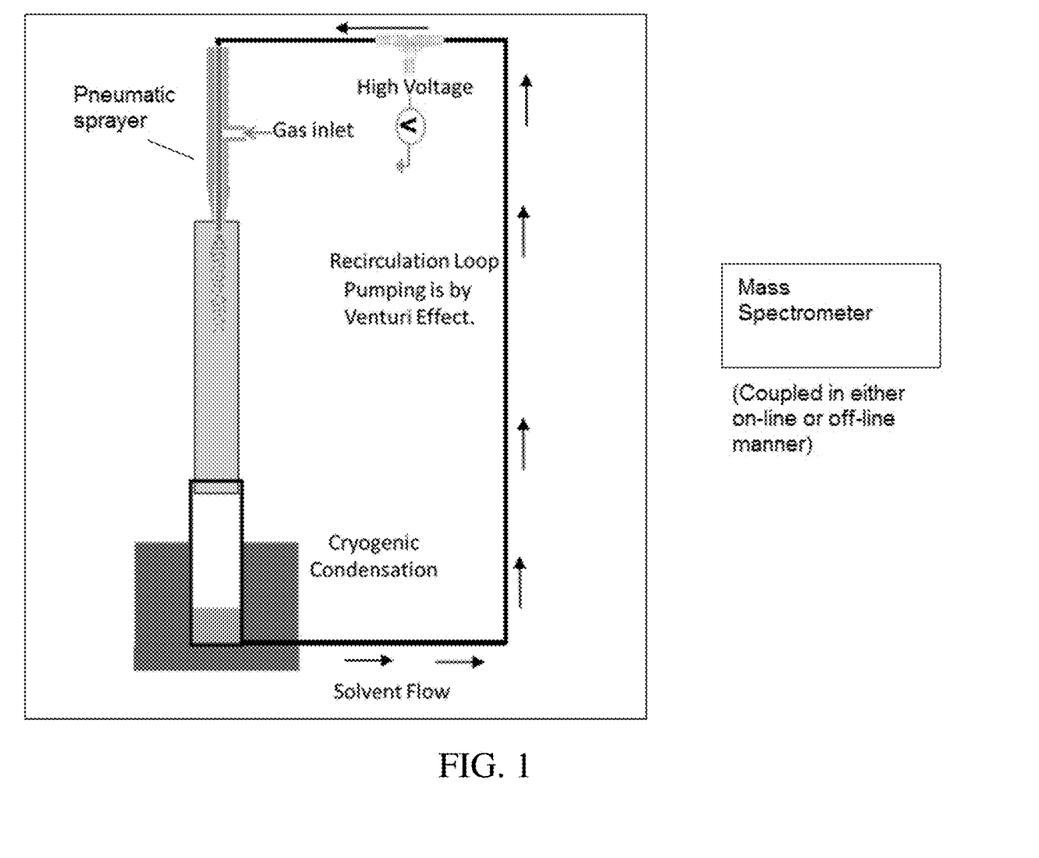
FIG. 1 is a schematic showing an embodiment of the invention inn which the collector includes a condenser.

FIG. 1 illustrates an embodiment of the invention. This embodiment includes simply a pneumatic sprayer, a cryogenic condenser, and a recirculation loop. In this embodiment, the pneumatic sprayer includes a high voltage source so that the produced liquid spray discharge is a charged liquid spray discharge. The high voltage source is an optional component of the pneumatic sprayer and in certain embodiments, a liquid spray discharge is produced without the need for a high voltage source. In this embodiment though, pneumatics and electrical potential are used to create a fine spray from a capillary, typically ID 100 microns.

The solvent introduced to the system includes molecules for a reaction, e.g., reactants. Any reactants can be used with systems and methods of the invention, e.g., organic or inorganic reactants. The solvent merely needs to be compatible with the reactants and the system. The solvent flows through the pneumatic sprayer and a liquid spray discharge including the reactants is produced. A portion of the reactants react with each other in the liquid spray discharge to produce a reaction product.

The pneumatic sprayer may be directly interfaced with the collector, such that the liquid spray discharge is produced directly within the collector. Alternatively, a tube can be interfaced between the liquid spray discharge and the collector. FIG. 1 shows that a tube is interfaced between the liquid spray discharge and the collector. In that manner, the liquid spray discharge travels a farther distance before reaching the collector. The greater distance allows for a longer time period for the reaction to occur. By controlling the distance between the pneumatic sprayer and the collector, e.g., by using tubes of varying distance, the extent of the formation of reaction product can be controlled. The longer the tube, the greater the distance the liquid spray discharge travels before reaching the condenser, the longer the time period the reactants have to react with each other in the liquid spray discharge. Control of droplet size and heating can also be used to control the extent of the formation of the reaction product. A heater can be included in the elongate member of the pneumatic sprayer or both.

The collector is positioned to receive the liquid spray discharge as shown in FIG. 1. The collector in FIG. 1 includes only a condenser, illustrated here as a cryogenic condenser. As discussed below, the collector can include more than just a condenser. Any commercially available cryogenic condenser can be used with systems of the invention, such as those sold by Air Products and Chemicals, Inc.

The liquid spray discharge includes reaction product and unreacted molecules. When the liquid spray discharge is introduced to the condenser, the liquid spray discharge is condensed back to solvent, which includes the reaction product and any unreacted molecules. The invention recognizes that to increase a yield of the reaction, the solvent including the reaction product and any unreacted molecules is recirculated by through the system. In that manner, unreacted molecules are given a chance to react and incomplete reactions can be driven to completion, thereby increasing the yield of the chemical reaction. To accomplish that, the systems of the invention include a recirculation loop as shown in FIG. 1. The recirculation loop connects the condenser back to the pneumatic sprayer to allow the solvent including the reaction product and any unreacted molecules to be re-sprayed by the pneumatic sprayer. The embodiment shown in FIG. 1 uses the Venturi effect to drive flow through the recirculation loop. As already discussed above, the skilled artisan will recognize that other mechanisms can be used to drive flow through the system.

Figure 2:
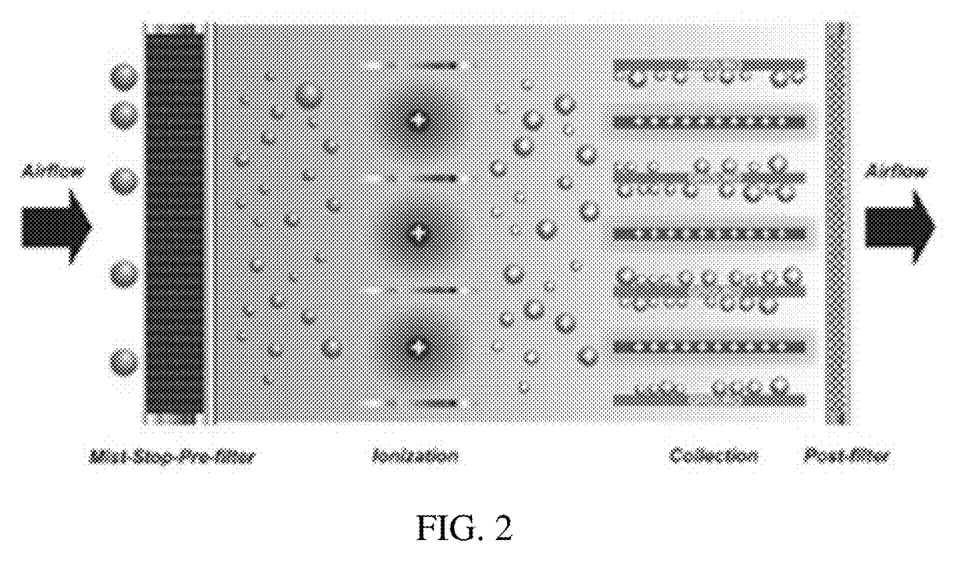
FIG. 2 is a schematic example of solvent condensation using a condenser.

In certain embodiments, an electrostatic precipitator is used in the collector instead of or in addition to the condenser. Numerous different types of electrostatic precipitators can be used with the systems and methods of the invention. FIG. 2 shows an exemplary process by which electrostatic precipitation occurs. FIG. 3 provides an example of an electrostatic precipitator. FIG. 3 shows a photograph of a simple charged droplet spray system connected to a simple silver wire electrostatic precipitator system. The spray potential and the potential on the electrostatic precipitator are both independently variable. This allowed variation in the potential difference from 0 to 8 kV. It also allowed operation in the reverse mode (positively charged droplets and negatively charged collector). In this embodiment, positively charged microdroplets from the sprayer (left) are attracted to the negatively charged silver wire electrostatic precipitator where they are deposited.

Figure 5:
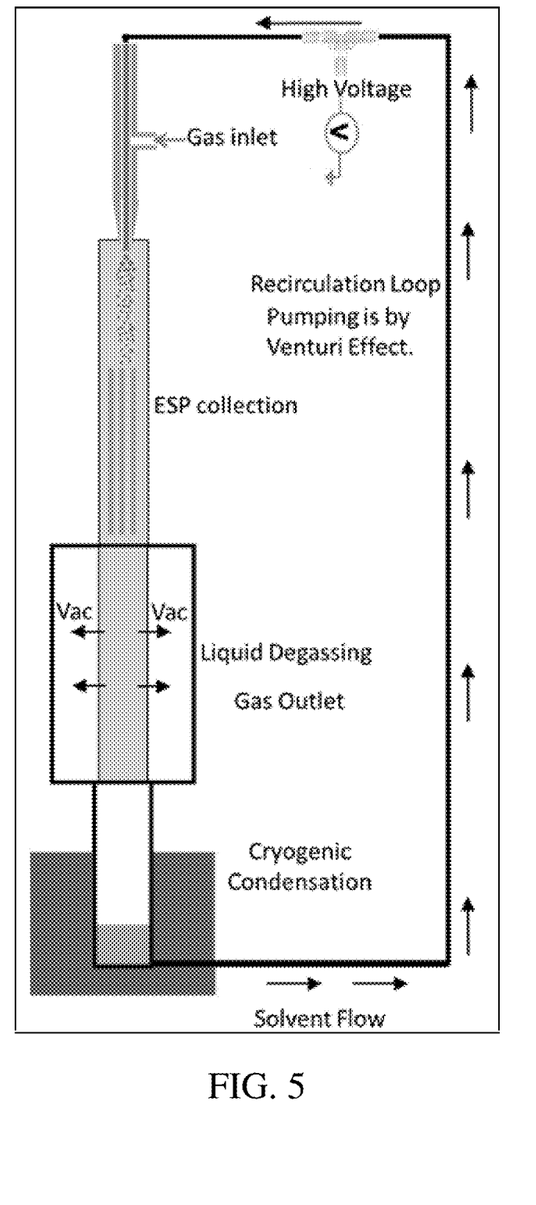

FIG. 5 shows another embodiment of the invention in which the collector includes the condenser, the electrostatic precipitator, and the liquid degassing unit. The system configuration is shown in FIG. 5. Again, the high voltage source is optional.

In certain embodiments, the systems of the invention include a bench-top or miniature mass spectrometer, such as described for example in Gao et al. (Z. Anal. 15 Chem. 2006, 78, 5994-6002), Gao et al. (Anal. Chem., 80:7198-7205, 2008), Hou et al. (Anal. Chem., 83:1857-1861, 2011), Sokol et al. (Int. J. Mass Spectrom., 2011, 306, 187-195), Xu et al. (JALA, 2010, 15, 433-439); Ouyang et al. (Anal. Chem., 2009, 81, 2421-2425); Ouyang et al. (Ann. Rev. Anal. Chem., 2009, 2, 187-25 214); Sanders et al. (Euro. J. Mass Spectrom., 2009, 16, 11-20); Gao et al. (Anal. Chem., 2006, 78(17), 5994-6002); Mulligan et al. (Chem. Com., 2006, 1709-1711); and Fico et al. (Anal. Chem., 2007, 79, 8076-8082), the content of each of which is incorporated herein by reference in its entirety.

An exemplary miniature mass spectrometer is described, for example in Gao et al. (Anal. Chem. 2008, 80, 7198-7205.), the content of which is incorporated by reference herein in its entirety. In comparison with the pumping system used for lab-scale instruments with thousands of watts of power, miniature mass spectrometers generally have smaller pumping systems, such as a 18 W pumping system with only a 5 L/min (0.3 m3/hr) diaphragm pump and a 11 L/s turbo pump for the system described in Gao et al. Other exemplary miniature mass spectrometers are described for example in Gao et al. (Anal. Chem., 2008, 80, 7198-7205.), Hou et al. (Anal. Chem., 2011, 83, 1857-1861.), PCT/US17/26269 to Purdue Research Foundation, and Sokol et al. (Int. J. Mass Spectrom., 2011, 306, 187-195), the content of each of which is incorporated herein by reference in its entirety.

The mass spectrometer may be interfaced online with the system or used off-line. In on-line embodiments, a tube can be connected to the electrostatic precipitator, the condenser, or the recirculation line. A portion of the solvent is diverted from the system and to the mass spectrometer. In such embodiment, the flow can go directly into another pneumatic sprayer, including a paper spray probe as described for example in U.S. Pat. No. 8,859,956, the content of which is incorporated by reference herein in its entirety, in order to generate a discharge that can be sent into the mass spectrometer.

In off-line embodiments, a portion of solvent is obtained from the electrostatic precipitator, the condenser, or the recirculation line and then analyzed by mass spectrometry.

Figure 4:
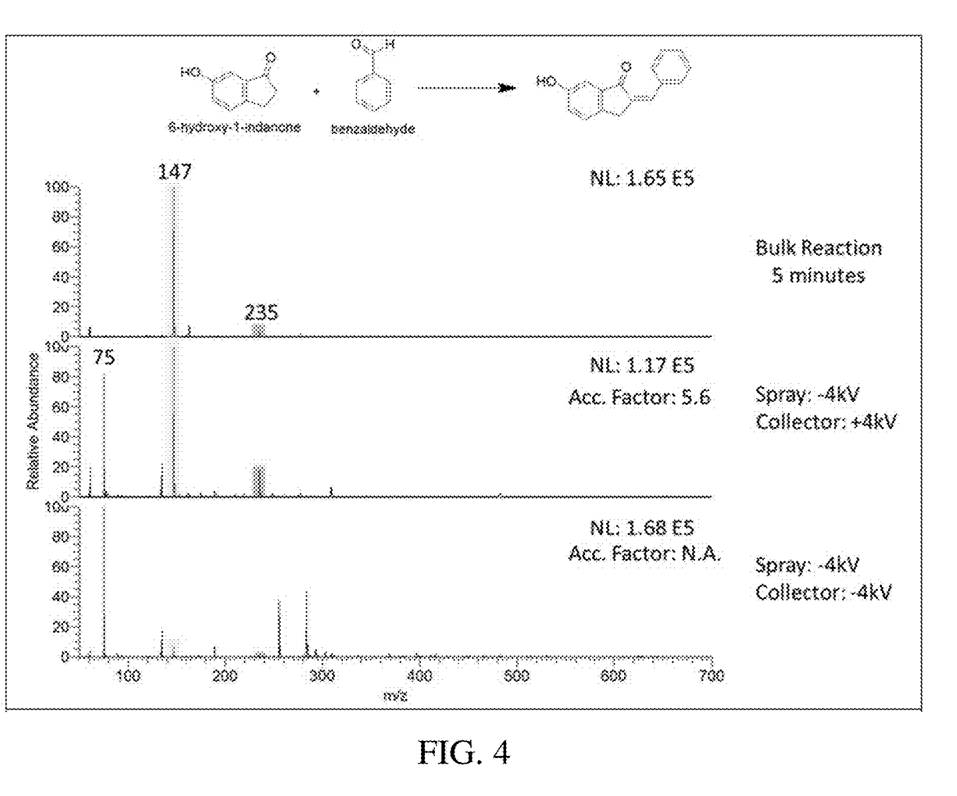

Experiments were done with a variety of voltage settings, with various spray distances and pneumatic pressures and flow rates to vary droplet size and flux. The main results of these experiments are shown in FIG. 4, which compares product formation in bulk phase (5 min reaction time) with a 5 min spray time at −4 kV/+4 kV and shows an increase of a factor of 5 in product formation and collection. The zero potential case showed no increase in product formation over bulk. In fact droplet collection was very poor and the total amount collected was an order of magnitude less than with the high potential difference. The same level of acceleration is noted when the polarity is flipped, i.e. +4 kV/−4 kV results in an acceleration factor of 5 with similar product collection.

System Architecture

In certain embodiments, the systems and methods of the invention can be carried out using automated systems and computing devices. Specifically, aspects of the invention described herein can be performed using any type of computing device, such as a computer, that includes a processor, e.g., a central processing unit, or any combination of computing devices where each device performs at least part of the process or method. In some embodiments, systems and methods described herein may be controlled using a handheld device, e.g., a smart tablet, or a smart phone, or a specialty device produced for the system.

Systems and methods of the invention can be performed using software, hardware, firmware, hardwiring, or combinations of any of these. Features implementing functions can also be physically located at various positions, including being distributed such that portions of functions are implemented at different physical locations (e.g., imaging apparatus in one room and host workstation in another, or in separate buildings, for example, with wireless or wired connections).

Processors suitable for the execution of computer program include, by way of example, both general and special purpose microprocessors, and any one or more processor of any kind of digital computer. Generally, a processor will receive instructions and data from a read-only memory or a random access memory or both. The essential elements of computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, solid state drive (SSD), and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having an I/O device, e.g., a CRT, LCD, LED, or projection device for displaying information to the user and an input or output device such as a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected through network by any form or medium of digital data communication, e.g., a communication network. For example, the reference set of data may be stored at a remote location and the computer communicates across a network to access the reference set to compare data derived from the female subject to the reference set. In other embodiments, however, the reference set is stored locally within the computer and the computer accesses the reference set within the CPU to compare subject data to the reference set. Examples of communication networks include cell network (e.g., 3G or 4G), a local area network (LAN), and a wide area network (WAN), e.g., the Internet.

The subject matter described herein can be implemented as one or more computer program products, such as one or more computer programs tangibly embodied in an information carrier (e.g., in a non-transitory computer-readable medium) for execution by, or to control the operation of, data processing apparatus (e.g., a programmable processor, a computer, or multiple computers). A computer program (also known as a program, software, software application, app, macro, or code) can be written in any form of programming language, including compiled or interpreted languages (e.g., C, C++, Perl), and it can be deployed in any form, including as a stand-alone program or as a module, component, subroutine, or other unit suitable for use in a computing environment. Systems and methods of the invention can include instructions written in any suitable programming language known in the art, including, without limitation, C, C++, Perl, Java, ActiveX, HTML5, Visual Basic, or JavaScript.

A computer program does not necessarily correspond to a file. A program can be stored in a file or a portion of file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

A file can be a digital file, for example, stored on a hard drive, SSD, CD, or other tangible, non-transitory medium. A file can be sent from one device to another over a network (e.g., as packets being sent from a server to a client, for example, through a Network Interface Card, modem, wireless card, or similar).

Writing a file according to the invention involves transforming a tangible, non-transitory computer-readable medium, for example, by adding, removing, or rearranging particles (e.g., with a net charge or dipole moment into patterns of magnetization by read/write heads), the patterns then representing new collocations of information about objective physical phenomena desired by, and useful to, the user. In some embodiments, writing involves a physical transformation of material in tangible, non-transitory computer readable media (e.g., with certain optical properties so that optical read/write devices can then read the new and useful collocation of information, e.g., burning a CD-ROM). In some embodiments, writing a file includes transforming a physical flash memory apparatus such as NAND flash memory device and storing information by transforming physical elements in an array of memory cells made from floating-gate transistors. Methods of writing a file are well-known in the art and, for example, can be invoked manually or automatically by a program or by a save command from software or a write command from a programming language.

Suitable computing devices typically include mass memory, at least one graphical user interface, at least one display device, and typically include communication between devices. The mass memory illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD) or other optical storage, magnetic cassettes, magnetic tape, magnetic disk storage or other magnetic storage devices, Radiofrequency Identification tags or chips, or any other medium which can be used to store the desired information and which can be accessed by a computing device.

As one skilled in the art would recognize as necessary or best-suited for performance of the methods of the invention, a computer system or machines of the invention include one or more processors (e.g., a central processing unit (CPU) a graphics processing unit (GPU) or both), a main memory and a static memory, which communicate with each other via a bus.

Figure 6:
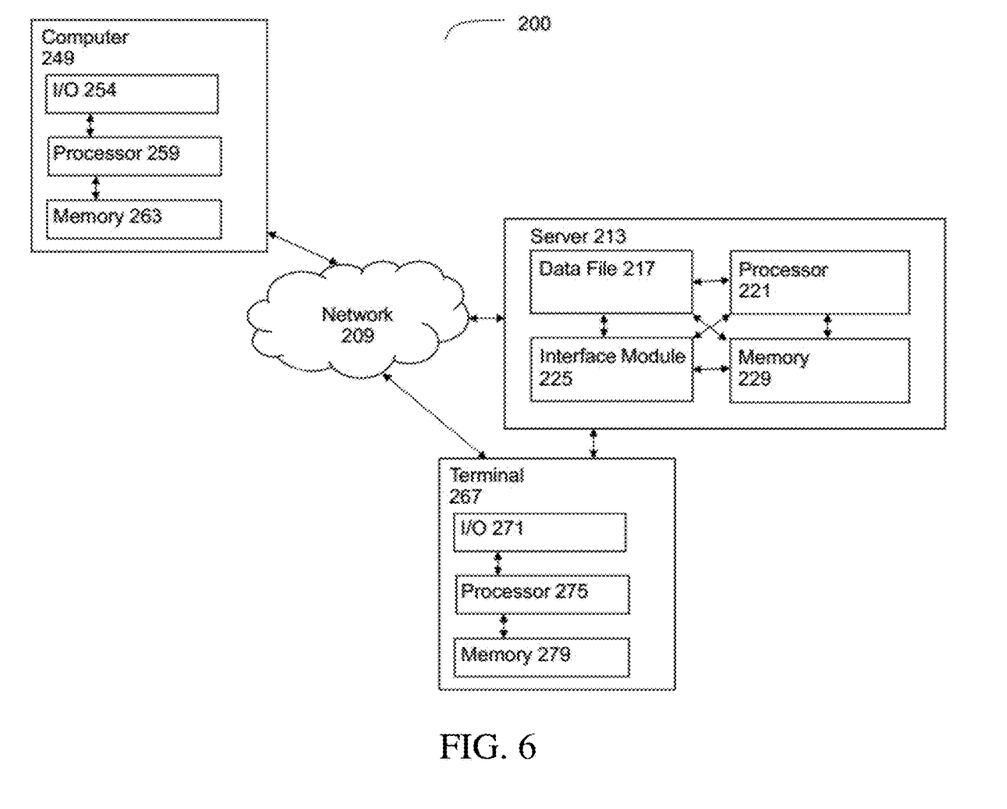

In an exemplary embodiment shown in FIG. 6, system 200 can include a computer 249 (e.g., laptop, desktop, or tablet). The computer 249 may be configured to communicate across a network 209. Computer 249 includes one or more processor 259 and memory 263 as well as an input/output mechanism 254. Where methods of the invention employ a client/server architecture, an steps of methods of the invention may be performed using server 213, which includes one or more of processor 221 and memory 229, capable of obtaining data, instructions, etc., or providing results via interface module 225 or providing results as a file 217. Server 213 may be engaged over network 209 through computer 249 or terminal 267, or server 213 may be directly connected to terminal 267, including one or more processor 275 and memory 279, as well as input/output mechanism 271.

System 200 or machines according to the invention may further include, for any of I/O 249, 237, or 271 a video display unit (e.g., a liquid crystal display (LCD) or a cathode ray tube (CRT)). Computer systems or machines according to the invention can also include an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

Memory 263, 279, or 229 according to the invention can include a machine-readable medium on which is stored one or more sets of instructions (e.g., software) embodying any one or more of the methodologies or functions described herein. The software may also reside, completely or at least partially, within the main memory and/or within the processor during execution thereof by the computer system, the main memory and the processor also constituting machine-readable media. The software may further be transmitted or received over a network via the network interface device.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

EXAMPLES

A system that carries out organic reactions at an accelerated rate on a macroscopic scale is described. The design is based upon a vapor compression system that continuously cycles a solvent from a liquid to a vapor. During the transition from liquid to vapor, droplets are created. Reagents added to the system react within these droplets at an accelerated rate. The system operates at a scale that could produces mg quantities of product with no loss of solvent.

Example 1: System for Increasing a Yield of a Chemical Reaction

The ability to rapidly synthesize mg-kg quantities of organic molecules of interest to the pharmaceutical industry, chemical manufacturers, and organic chemists in general; however, this is often not possible because many organic reactions take a significant amount of time (sometimes days) to complete. Methods that accelerate the rates of organic reactions would enable the synthesis of a wide variety of targets in a time-efficient manner.

It has been demonstrated that organic reactions were accelerated when they occurred in the charged microdroplets generated by desorption electrospray ionization (DESI). Since that time, there have been several reports that describe many different reactions that are accelerated in microdroplets (or other confined volume regions such as thin films), most of which involve charged microdroplets generated by electro spray ionization (ESI).

There are several theories as to why reactions are accelerated in charged microdroplets. Through repeated cycles of evaporation and columbic fission, the droplets generated in ESI shrink over time. This concentrates the reagents within the droplets increasing the frequency with which they undergo collisions. If the reagents are charged or hydrophobic (assuming a polar solvent such as water, methanol, or acetonitrile is used), they are more likely to reside on the surface of the droplet. This provides a further concentration effect as the reagents are restricted to the surface rather than traveling the droplet. It also reduces the solvation of the reagents because they are located at the solvent-air interface. This reduction in solvation lowers the activation energy barrier of the reaction further increasing the rate. Another factor which may contribute to the rate enhancement of acid or base catalyzed reactions is that the pH within the droplets likely reaches extremes because charge (either positive or negative depending on the polarity of the applied voltage) concentrates in the droplets as they shrink.

Microdroplets are not the only method by which reactions have been accelerated, and other possible approaches include sonication or irradiation with microwaves to increase the rates of organic reactions. When compared to the techniques that use microdroplets, these methods appear to be harsher because they rely on generating regions within the reaction mixture that have extremely high temperatures or pressures; however, they do have the advantage of being larger scale techniques that are able to produce macroscopic quantities of product.

There have been efforts to use the reaction acceleration provided by microdroplets to produce mg quantities of products; however, these techniques rely on the continuous evaporation of solvent. Depending on the solvent used, this constant consumption of solvent results in these techniques being environmentally unfriendly, expensive, and/or unsafe for user.

To harness the power of the reaction rate enhancements provided by microdroplets while eliminating the issue of solvent consumption, we have designed a process in which organic reactions are carried out within a vapor compression system (VCS).

Figure 7:
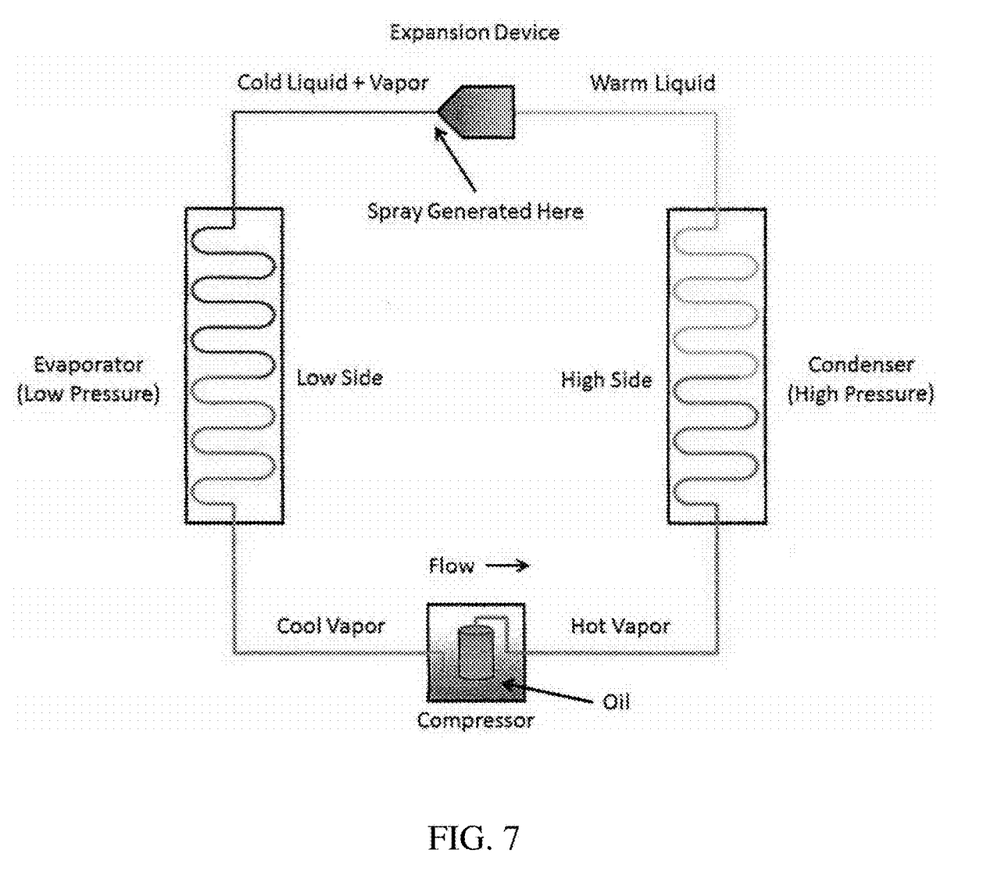

A VCS (FIG. 7) is the means by which refrigerators and air conditioners provide cooling. There are four main parts of a VCS: the compressor, condenser, evaporator, and expansion device. The entire system is sealed in a gas-tight manner and has a fixed volume. These systems are typically evacuated using a vacuum pump to remove contaminants, and then a certain quantity of a low boiling point liquid called a refrigerant is added to the system. An example of a commonly used refrigerant is R-134a (1,1,1,2-tetrafluoroethane).

A VCS provides cooling by repeatedly cycling the refrigerant between the liquid and vapor phases. Inside of the evaporator, the refrigerant evaporates from a liquid to a vapor. During this process, it absorbs heat from the surrounding air. Inside of the condenser, the refrigerant condenses back a liquid. This process releases the heat that was absorbed by the refrigerant in the evaporator to the surrounding environment. If the evaporator is placed inside a refrigerator (or a home in the case of air conditioning) while the condenser is placed on the outside, the system will "pump" heat from the inside to the outside lowering the temperature within the unit.

The control over the evaporating and condensing temperatures of the refrigerant is provided by the combination of the compressor and the expansion device. The compressor is a pump which pulls vapor from the evaporator side of the system and pushes it into the condenser side of the system. The expansion device simply provides a flow restriction between the two sides of the system. This means that when the compressor is turned on, a greater quantity of vapor is added to the condenser side during each cycle of the compressor than can flow out through the expansion device. Correspondingly, more vapor is removed from the evaporator during each compressor cycle than flows in through the expansion device. This increases the pressure within the condenser and lowers the pressure within the evaporator. This is why the condenser and evaporator regions of the system are often called the high and low sides respectively.

The result of the high pressure created within the condenser is that the boiling point of the refrigerant is raised to the point where it condenses. Refrigerants are typically gases at standard temperature and pressure, so the high pressure created within the condenser is necessary to force the refrigerant to condense at ambient temperature. Once the refrigerant has reached the end of the condenser, it has fully condensed into a liquid. This liquid then flows through the expansion device into the evaporator. The low pressure within the evaporator lowers the boiling point of the refrigerant causing it to evaporate. Once the refrigerant reaches the end of the evaporator it has completely evaporated into a gas. This gas then flows into the compressor, and the cycle repeats.

We propose that a VCS could be used to carry out organic reactions in an accelerated manner while conserving solvent. This is possible because a spray is created at the exit of the expansion device because some of the liquid refrigerant flash vaporizes into a gas when it is exposed to the low pressure of the evaporator. The droplets that are generated in this spray could serve as accelerated reactors if reagents are added to the system with the refrigerant. Since the refrigerant that evaporates from these droplets is contained within the system, no solvent is lost during this process. There is also the possibility that thin film effects could lead to reaction acceleration when the liquid refrigerant splashes against and coats the walls of the evaporator during the non-linear path it takes back to the compressor.

This Example illustrates a VCS system that can be used as an accelerated organic reactor. Because these systems are typically sealed from the outside environment, a ways to add reagents and remove product was engineered. A way to allow for features such as online monitoring of reaction progress was also engineered.

A Fisher Scientific model 97-960-1 miniature refrigerator was used as the basis of a design. This model is a sealed unit (no access ports) which uses R-134a as the refrigerant and has a capillary tube as the expansion device. A capillary tube is a long section of very narrow diameter tubing that creates a flow restriction between the condenser and evaporator. The stock condenser and evaporator coils were made out of steel and aluminum respectively. These metals are more challenging to manipulate than copper, so they were removed, and new condenser and evaporator coils were made from ¼ in. ACR copper tubing. These new coils were designed to be approximately equal in volume to the original coils so that they would be compatible with the stock compressor.

Figure 8:
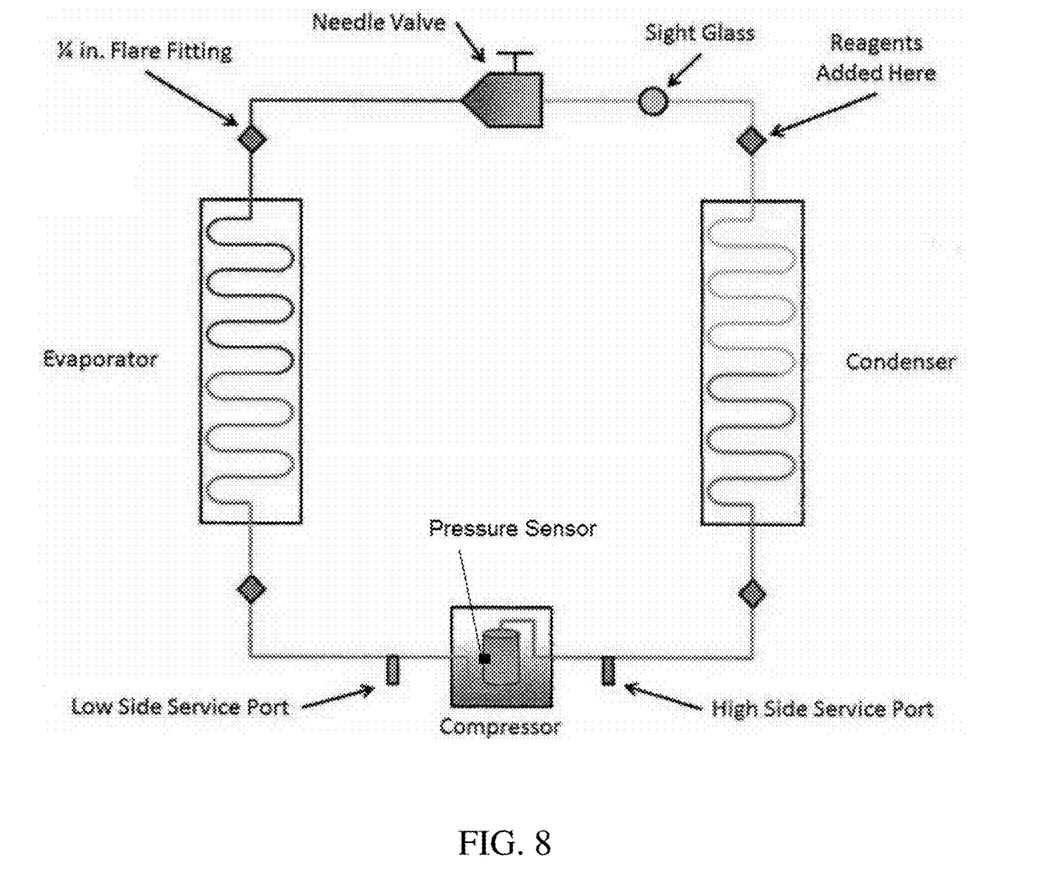

The design of the system is laid out in FIG. 8. Joints between copper tubes in refrigeration systems are typically brazed because brazed joints are strong and leak-free; however, brazed joints do not allow for repeated removal and attachment of the joint. Because our system requires repeated opening to add reagents and remove product, the joints in our system were made using ¼ in. flare fittings. These fittings are gas-tight and can be repeatedly removed and attached.

Reagents will be added by undoing the flare fitting located on the liquid line, which is the tubing that connects the condenser to the expansion device. Since under normal operating conditions warm liquid refrigerant flows in the liquid line, the reagents should dissolve quickly.

A small chamber with a window, called a sight glass, was added to the liquid line after the above mentioned flare fitting. This allows for visual observation of the flow of liquid refrigerant through the system and will help detect problems such as reagents not dissolving.

Service ports were added immediately preceding and following the compressor. These ports allow for the attachment of a manifold gauge set. A manifold gauge set is used to monitor the pressures of the high and low sides of the system as well as pull a vacuum and add or remove refrigerant. A manifold gauge set consists of three hoses and two gauges. One hose connects to the low side service port, and one gauge reads the pressure on this hose. Another hose connects to the high side service port, and the second gauge reads the pressure on this hose. The third hose (called the utility hose) can connect to a vacuum pump, refrigerant cylinder, or recovery machine depending on the service being performed.

The capillary tube that was originally used as the expansion device was removed, and a needle valve was installed in its place. A needle valve allows for adjustment the of flow restriction between the condenser and evaporator which allows for some control over the pressures in the high and low sides. Adjusting the pressures in the evaporator and condenser changes the evaporating and condensing temperatures of the refrigerant. This is important because under normal operation of the system, the evaporating temperature of R-134a was approximately −10° C. It is unclear how reaction acceleration in microdroplets would be affected by such a low temperature, and it would be desirable to have control over the evaporating temperature so that its effects can be studied.

The reactions that have been targeted for the initial tests of the system are alkylation reactions involving various benzylamines and benzyl bromides. These reactions were chosen because they have been successfully used in previous reaction acceleration studies, and they do not require the addition of an acid or base, which could potentially damage the system. They do produce HBr as a byproduct, but they system will likely be run for only a short period of time, so the impact of this byproduct should be minimal.

The appropriate quantities of reagents will weighed onto weighing paper. The weighing paper will be rolled into a cylinder and used to dispense the reagents directly into the liquid line at the joint following the condenser. The joint will be reconnected, and a manifold gauge set will be attached to the high and low side service ports. The utility hose of the manifold gauge set will be attached to a vacuum pump, and a vacuum will be pulled on the system.

The utility hose will then be attached to a canister of R-134a refrigerant, and approximately 85 grams of R-134a will be charged into the system. 85 grams was the amount of refrigerant originally charged into the Fisher Scientific miniature refrigerator, so it will be used at the starting point; however, the charge can be adjusted to optimize the system's performance. The system will be turned on and allowed to run for some amount of time. The system will then be turned off, and the utility hose of the manifold gauge set will be attached to a refrigerant recovery machine. A recovery machine is used to pull refrigerant out of a system, condense it into a liquid, and then store it in a refrigerant recovery cylinder. A recovery machine can remove refrigerant as either a liquid or a gas. In these experiments, the refrigerant will be removed as a gas so that any product remains in the system.

Once the refrigerant has been evacuated, the condenser and evaporator will be removed from the system. They will both be flushed with solvent to recover any product, leftover starting material, and/or byproducts that are present.

The system will be run for different lengths of time to determine how quickly product forms within the system. It will also be run with the needle valve in various positions to observe the impact of changing the evaporating temperature on reaction acceleration.

A complicating factor in this experiment is the presence of oil in the compressor. Most refrigeration compressors are designed such that oil flows around all of the components contained within the compressor housing. This means that oil is present in the cylinder when the refrigerant vapor is compressed and consequently small amounts of oil travel with the refrigerant throughout the vapor compression system.

The oils used in R-134a systems are polyolester oils. These oils are esters made by combining pentaerythritol with various fatty acids. It is unclear whether or not the small amount of oil circulating throughout the system will interfere with the reactions. Another complicating factor is that these oils often contain additives to neutralize acid or prevent wear, and these may also interfere with the reactions.

If the oil does end up being a problem, an oil-free compressor could be used and they do not circulate oil. If the additives within the oil present a problem, polyolester oil which does not contain additives is available.

Assuming the design of the system is successful, there are several modifications within the scope of the invention. For example, the current system is designed for use with R-134a as the refrigerant. This was chosen because that was the refrigerant used in the Fisher Scientific miniature refrigerator. Other solvents may be used instead of R-134a with additional modifications to the system. For example, it would be desirable if the solvents commonly used in organic laboratories, such as methanol, acetonitrile, and dichloromethane, worked in this system. These solvent are all liquids at room temperature and atmospheric pressure. These solvents could potentially work in the system if the evaporator was heated, for example by wrapping it with heating tape, beyond the boiling points of these solvents.

These solvents could also be made to evaporate at room temperature (or below) by lowering the pressure in the evaporator to vacuum levels. This is possible with the current compressor if the needle valve is barely opened, creating an increased flow restriction between the condenser and evaporator.

The invention also contemplates incorporating online monitoring of the reaction progress, preferentially by mass spectrometry. A needle valve with a tube extending from it could be incorporated somewhere along the liquid line to achieve this purpose. This needle valve could be cracked allowing a small volume of liquid to escape from the end of the tube. A voltage could be applied to the tube forming an electro spray plume which can be directed towards the inlet of a mass spectrometer. A similar valve could be placed somewhere along the evaporator to monitor reaction progress there. This works best if the heating method is used to induce evaporation because this creates an elevated pressure within the evaporator allowing liquid/vapor to flow out. Ultimately a system such as this would be most useful if a means was developed by which reagents could be added continuously and product could be removed continuously. This might be possible if the product cycles back to the condenser. A port could be added just after the condenser from which solvent is continuously drawn and product is collected. Another port could be added downstream, possibly right before the expansion device, into which reagents are continuously pumped at the same flow rate as product is being removed.

Example 2: Reaction of 4-Dimethylaminobenzylamine and Benzyl Bromide Using Systems of the Invention The following reaction Scheme 1 was carried out using systems of the invention.

Scheme 1: Reaction of 1 (4-dimethylaminobenzylamine) and 2 (benzyl bromide)

Figure 9:
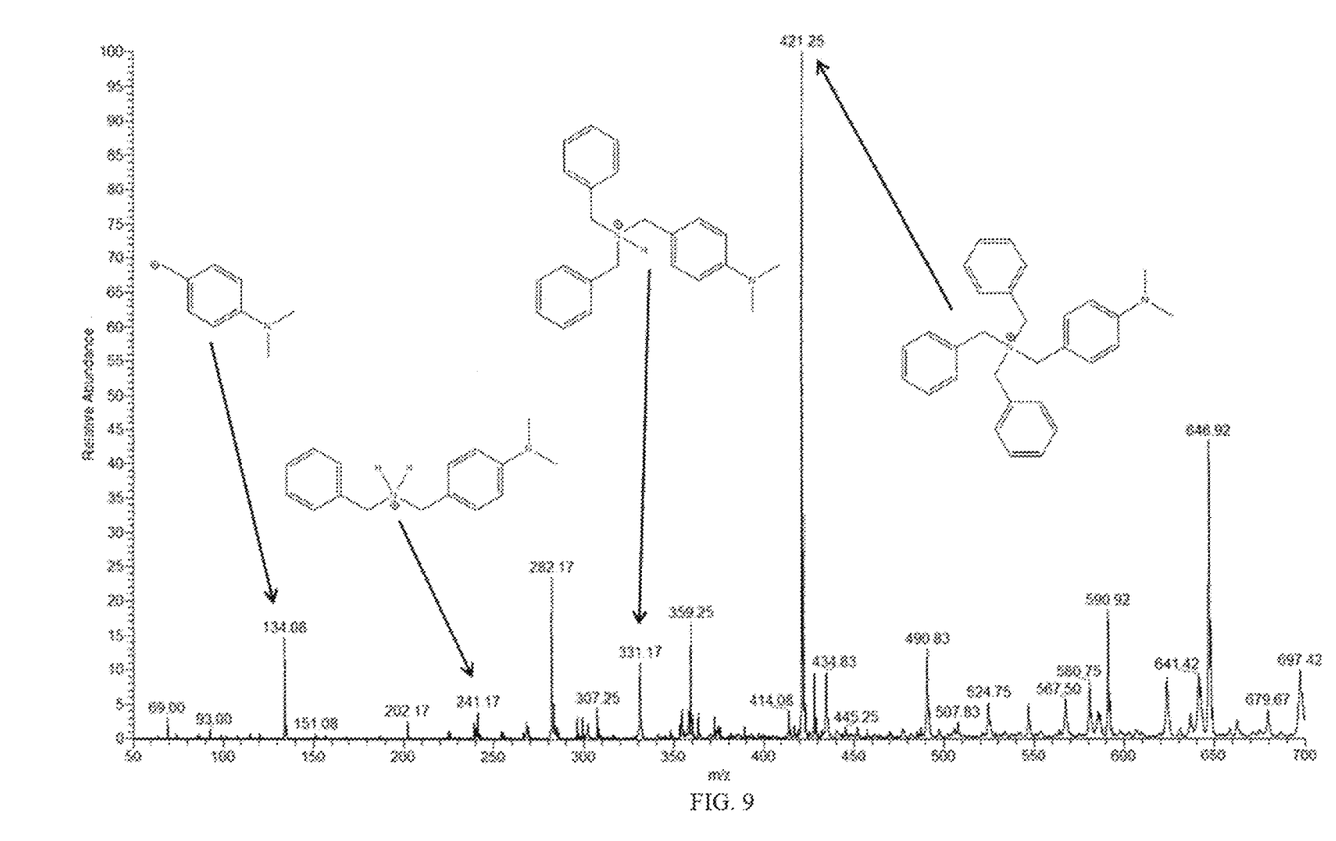

15.4 uL of 1 (4-dimethylaminobenzylamine) and 12.5 uL of 2 (benzyl bromide) were pipetted into the condenser coil of a refrigeration system that includes a compressor from a miniature refrigerator, evaporator and condenser coils constructed from copper tubing, and a needle valve acting as the expansion device. 100 mL of R-134a (1,1,1,2-tetrafluoroethane) was then added to the system. The compressor was turned on, and the system was allowed to run for 65 minutes. The condensing temperature during the experiment was 51° C., and the evaporating temperature was 8.6° C. After 65 minutes, the compressor was turned off, and the R-134a was removed using a refrigerant recovery machine. The condenser coil, needle valve, and evaporator coil were then rinsed as a unit with 425 mL of dichloromethane, followed by 1000 mL of ethanol, followed by 300 mL of water. These three solutions were then combined and analyzed by nESI on a Thermo LTQ to give the mass spectrum shown in FIG. 9.

What is claimed is:

1. A system for increasing a yield of a chemical reaction, the system comprising:
    a single pneumatic sprayer operably associated with a voltage source in order to generate a charged liquid spray discharge;
    a collector comprising a single inlet, wherein the single inlet of the collector is operably associated with only the single pneumatic sprayer and is positioned to receive the liquid spray discharge, wherein the system is configured such that discharge from the single pneumatic sprayer passes directly from the single pneumatic sprayer to the collector without heating from a heater; and
    a recirculation loop connected from the collector solely to the single pneumatic sprayer in order to allow the liquid spray discharge to be recycled solely through the pneumatic sprayer.

2. The system according to claim 1 wherein the collector comprises an electrostatic precipitator.

3. The system according to claim 2, wherein the collector further comprises a liquid degassing unit within a vacuum chamber positioned after the electrostatic precipitator, thereby allowing gas from the pneumatic sprayer to be released from the system.

4. The system according to claim 3, wherein the liquid degassing unit comprises a semi-permeable membrane within the vacuum chamber.

5. The system according to claim 3, wherein the collector further comprises a condenser positioned after an outlet of the liquid degassing unit within the vacuum chamber.

6. The system according to claim 5, wherein the condenser is a cryogenic condenser.

7. The system according to claim 5, further comprising a mass spectrometer.

8. The system according to claim 1, wherein the pneumatic sprayer is an electrosonic spray ionization source.

9. The system according to claim 1, further comprising an elongate member between the pneumatic sprayer and the collector.

10. A system comprising:
a refrigerant apparatus comprising:
an inlet port;
a droplet forming region comprising a single spray generator operably associated with a voltage source to generate an electrospray plume; and
a condensing region that at a proximal end is only accessed via the inlet port that is operably associated with only the single spray generator, wherein the droplet forming region and the liquid condensing region are operably coupled to each other via tubing to form a circulating loop for flow such that a portion of reagents introduced via the inlet port react with each other in droplets formed in the droplet forming region to produce reaction product, which reaction product is condensed along with unreacted reagents in the condensing region and the reaction product and the unreacted reagents are re-circulated through only the single spray generator and the system one or more times, thereby allowing the unreacted reagents to react with each other as the unreacted reagents cycle again through the system.

11. The system according to claim 10, wherein the droplet forming region comprises a flow regulating valve and an evaporator.

12. The system according to claim 11, wherein the condensing region comprises a condenser.

13. The system according to claim 12, further comprising a pump.

14. The system according to claim 13, wherein the pump is a compressor, which is situated between the evaporator and the condenser.

15. The system according to claim 14, wherein a portion of the tubing is transparent.

16. The system according to claim 14, further comprising one or more pressure sensors.

17. The system according to claim 14, further comprising an outlet port.

18. The system according to claim 17, wherein the outlet port is coupled to an outlet tube that is operably associated with the voltage source in a manner such that the electrospray plume is generated at a distal end of the outlet tube.

19. The system according to claim 18, further comprising a mass spectrometer, operably associated with the system to receive the spray generated at the distal end of the outlet tube.

\* \* \* \* \*